United States Patent
Kuechler et al.

(10) Patent No.: US 6,437,208 B1
(45) Date of Patent: Aug. 20, 2002

(54) MAKING AN OLEFIN PRODUCT FROM AN OXYGENATE

(75) Inventors: Keith H. Kuechler, Friendswood, TX (US); Marcel J. G. Janssen, Kessel-Lo (BE); Stephen N. Vaughn, Kingwood, TX (US); Shun C. Fung, Bridgewater, NJ (US); Nicolas P. Coute, Houston, TX (US); Jeffrey Scott Smith, Seabrook, TX (US); James R. Lattner, Seabrook, TX (US); Jeffrey L. White, Kingwood, TX (US); Teng Xu, Houston, TX (US); William L. Kuechler, Sr., Hilton Head, SC (US); Machteld M. Mertens, Boortmeerbeek; Cornelius W. M. Van Oorschot, Braschaat, both of (BE)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

(21) Appl. No.: 09/481,364

(22) Filed: Jan. 11, 2000

Related U.S. Application Data
(60) Provisional application No. 60/156,570, filed on Sep. 29, 1999.

(51) Int. Cl.⁷ .................................................. C07C 1/20
(52) U.S. Cl. ....................................... 585/640; 585/639
(58) Field of Search ................................ 585/634, 640; 502/214

(56) References Cited

U.S. PATENT DOCUMENTS

| | | | |
|---|---|---|---|
| 3,221,073 A | 11/1965 | Davis et al. | 260/677 |
| 3,258,455 A | 6/1966 | Natta et al. | 260/93.7 |
| 3,305,538 A | 2/1967 | Natta et al. | 260/93.7 |
| 3,364,190 A | 1/1968 | Emrick | 260/93.7 |
| 3,645,992 A | 2/1972 | Elston | 260/80.78 |
| 4,052,479 A | 10/1977 | Chang et al. | 260/682 |
| 4,058,576 A | 11/1977 | Chang et al. | 260/673 |
| 4,068,136 A | 1/1978 | Minami | 307/353 |
| 4,071,573 A | 1/1978 | Owen et al. | 260/668 |
| 4,072,732 A | 2/1978 | Hargis et al. | 260/682 |
| 4,073,733 A | 2/1978 | Hargis et al. | 260/682 |
| 4,076,698 A | 2/1978 | Anderson et al. | 526/348.6 |
| 4,083,888 A | 4/1978 | Caesar et al. | 200/682 |
| 4,083,889 A | 4/1978 | Caesar et al. | 260/682 |
| 4,229,608 A | 10/1980 | Chen et al. | 585/640 |
| 4,243,691 A | 1/1981 | Mohlenkamp, Jr. et al. | 426/649 |
| 4,302,565 A | 11/1981 | Goeke et al. | 526/88 |

(List continued on next page.)

FOREIGN PATENT DOCUMENTS

| | | |
|---|---|---|
| CA | 1 130 820 | 8/1982 |
| CA | 1 196 031 | 10/1985 |
| EP | 091 751 | 10/1983 |

(List continued on next page.)

OTHER PUBLICATIONS

Methanol Conversion to Light Olefins (Clarence D. Chang) (1984).

Production of Chemicals from Methanol (Warren W. Kaeding & Stephen A. Butter) (1980).

(List continued on next page.)

*Primary Examiner*—Thuan D. Dang
(74) *Attorney, Agent, or Firm*—Bradley A. Keller; Paul T. LaVoie

(57) ABSTRACT

Disclosed is a method for making olefin product from an oxygenate-containing feedstock. In the method, a silicoaluminophosphate molecular sieve catalyst is contacted with the oxygenate-containing feedstock in a reactor at an average catalyst feedstock exposure index of at least 1.0. The method produces lower coke yield and provides an olefin product which is low in $C_1$–$C_4$ paraffin content. The invention is particularly effective in producing an olefin product having a very low propane content.

28 Claims, 7 Drawing Sheets

U.S. PATENT DOCUMENTS

| | | | |
|---|---|---|---|
| 4,358,395 A | 11/1982 | Haag et al. | 252/411 |
| 4,379,123 A | 4/1983 | Daviduk et al. | 422/142 |
| 4,393,265 A | 7/1983 | Bonifaz | 585/639 |
| 4,433,188 A | 2/1984 | Hoelderich et al. | 585/640 |
| 4,440,871 A | 4/1984 | Lok et al. | 502/214 |
| 4,449,961 A | 5/1984 | Forbus et al. | 585/640 |
| 4,499,327 A | 2/1985 | Kaiser | 585/640 |
| 4,513,160 A | 4/1985 | Avidan et al. | 585/640 |
| 4,547,616 A | 10/1985 | Avidan et al. | 585/640 |
| 4,560,537 A | 12/1985 | Tabak | 422/190 |
| 4,567,029 A | 1/1986 | Wilson et al. | 423/306 |
| 4,590,320 A | 5/1986 | Sapre | 585/324 |
| 4,638,106 A | 1/1987 | Pieters et al. | 585/640 |
| 4,659,685 A | 4/1987 | Coleman, III et al. | 502/113 |
| 4,665,268 A | 5/1987 | Lee et al. | 585/640 |
| 4,677,242 A | 6/1987 | Kaiser | 585/638 |
| 4,677,243 A | 6/1987 | Kaiser | 585/638 |
| 4,689,205 A | 8/1987 | Gould et al. | 422/142 |
| 4,752,651 A | 6/1988 | Kaiser | 585/640 |
| 4,861,743 A | 8/1989 | Flank et al. | 502/214 |
| 4,861,938 A | 8/1989 | Lewis et al. | 585/640 |
| 4,873,390 A | 10/1989 | Lewis et al. | 585/638 |
| 4,973,792 A | 11/1990 | Lewis et al. | 585/638 |
| 5,028,400 A | 7/1991 | Harandi et al. | 422/211 |
| 5,095,163 A | 3/1992 | Barger | 585/640 |
| 5,096,684 A | 3/1992 | Guth et al. | 423/306 |
| 5,126,308 A | 6/1992 | Barger et al. | 502/214 |
| 5,157,181 A | 10/1992 | Stine et al. | 585/329 |
| 5,177,283 A | 1/1993 | Ward | 585/446 |
| 5,191,141 A | 3/1993 | Barger et al. | 585/640 |
| 5,233,117 A | 8/1993 | Barger | 585/640 |
| 5,414,181 A | 5/1995 | Bearden, Jr. et al. | 585/654 |
| 5,447,622 A | 9/1995 | Kerby et al. | 208/78 |
| 5,475,182 A | 12/1995 | Janssen | 585/640 |
| 5,510,559 A | 4/1996 | Barger et al. | 585/664 |
| 5,663,471 A | 9/1997 | Kvisle et al. | 585/639 |
| 5,714,662 A | 2/1998 | Vora et al. | 585/640 |
| 5,714,663 A | 2/1998 | Serrand et al. | 585/648 |
| 5,744,680 A | 4/1998 | Mulvaney, III et al. | 585/640 |
| 5,811,621 A | 9/1998 | Van Dijk | 585/639 |
| 5,817,906 A | 10/1998 | Marker et al. | 585/640 |
| 5,892,079 A | 4/1999 | Wilson, Jr. | 556/11 |
| 5,912,393 A | 6/1999 | Barger et al. | 585/640 |
| 5,925,800 A | 7/1999 | Sun et al. | 585/640 |
| 6,121,503 A | 9/2000 | Janssen et al. | 585/640 |

FOREIGN PATENT DOCUMENTS

| | | |
|---|---|---|
| EP | 0 357 831 | 3/1990 |
| EP | 359841 A1 * | 3/1990 |
| EP | 359 843 | 3/1990 |
| EP | 882 692 | 12/1998 |
| FR | 2669627 | 5/1992 |
| JP | 62070325 | 9/1985 |
| WO | WO-93/24431 A1 * | 12/1993 |
| WO | WO 97/21652 | 6/1997 |
| WO | WO 97/45196 | 12/1997 |
| WO | WO 98/29519 | 7/1998 |
| WO | WO 99/18055 | 4/1999 |
| WO | WO 00/49106 | 8/2000 |

OTHER PUBLICATIONS

Converting Natural to Ethylene and Propylene by the UOP/Hydro MTO Process (Barger et al.) ($12^{th}$ International Zeolite Conference, 1999 Materials Research Society).

Moller et al., "Activity, Selectivity, Deactivation and Crystal Size Behavior of MTO Conversion Over ZSM–5 in a Jetloop Recycle Reactor", 12th Annual International Zeolite Conference, 1999 Materials Research Society, pp. 591–599.

A. N. Rene Bos and Peter J. J. Tromp, Henk N. Akse, Ind. Eng. Chem. Res. 1995, 34, 3808–3816, "Conversion of Methanol to Lower Olefins. Kinetic Modeling, Reactor Simulation, and Selection".

D. Chen, H.P. Rebo, K. Moljord, and A. Holmen, Ind. Eng. Chem. Res. 1997, 36, 3473–3479, "Influence of Coke Deposition on Selectivity in Zeolite Catalysis".

Eng et al, "Integration of the UOP/Hydro MTO Process into Ethylene Plants," $10^{th}$ Ethylene Producers'Conference 1998.

Vora and Marker, "Conversion of Natural gas to Ethylene and Propylene: UOP/Hydro MTO Process," paper presented at the 2nd International Petroleum Conference and Exhibition, New Delhi, Jan., 1997.

J. Liang et al., "Characteristics and Performance of SAPO–34 Catalyst for Methanol to Olefin Conversion," Applied Catalysis, 64 (1990) 31–40.

Blackwell and Patton, J. Phys. Chem., 92, 3965 (1988).

International Search Report for PCT/US00/26004 dated Feb. 9, 2001.

* cited by examiner

Propane selectivity as a function ACFE: effect of composition

Propane selectivity as a function of ACFE: effect of operating conditions

MAKING AN OLEFIN PRODUCT FROM AN OXYGENATE

This application claims priority to U.S. Provisional Patent Application No. 60/156,570, filed Sep. 29, 1999, the entire disclosure of which is incorporated herein by reference.

FIELD OF THE INVENTION

This invention relates to a method for converting an oxygenate feedstock to an olefin product. In particular, this invention relates to a method for converting an oxygenate feedstock to an olefin product by contacting the feedstock with a silicoaluminophosphate catalyst at an average catalyst feedstock exposure index of at least 1.0.

BACKGROUND OF THE INVENTION

Olefins, particularly ethylene and propylene, have been traditionally produced from petroleum feedstocks by either catalytic or steam cracking. Promising alternative feedstocks for making ethylene and propylene are oxygenates. Particularly promising oxygenate feedstocks are alcohols, such as methanol and ethanol, dimethyl ether, methyl ethyl ether, diethyl ether, dimethyl carbonate, and methyl formate. Many of these oxygenates can be produced by fermentation, or from synthesis gas derived from natural gas, petroleum liquids, coke materials, including coal, recycled plastics, municipal wastes, or any appropriate organic material. Because of the wide variety of sources, alcohol, alcohol derivatives, and other oxygenates have promise as an economical, non-petroleum source for ethylene and propylene production.

In converting oxygenates to ethylene and propylene products, by-products are also formed. Representative by-products include alkanes (methane, ethane, propane, and larger), aromatic compounds, carbon oxides and carbonaceous deposits on and within the catalyst materials (also referred to as "coke").

During conversion of oxygenates to ethylene and propylenes, coke deposits accumulate on and/or within the catalyst. As the amount of these coke deposits increases, the catalyst begins to lose activity-and, consequently, less of the feedstock is converted to the ethylene and propylene products. At some point, the build up of these coke deposits causes the catalyst to reduce its capability to convert the oxygenates to -ethylene and propylenes, and the catalyst is considered deactivated. Once a catalyst becomes deactivated, it must be removed from them reaction vessel and replaced with activated catalyst. To reduce catalyst costs, activated catalyst is obtained by removing the coke deposits from the deactivated catalyst. This process is typically referred to as regeneration, and typically takes place in a vessel called a regenerator.

Catalyst regeneration is typically accomplished by removing the deactivated catalyst from the reactor vessel, burning off the coke material in the regenerator to re-activate or regenerate the catalyst, and returning the regenerated catalyst to the reactor. Conventionally, the regenerated catalyst is returned to the reactor via an inlet near the bottom quarter of the reactor. By returning the regenerated catalyst near the inlet of the reactor, the regenerated catalyst can immediately contact feed and begin the conversion reaction.

Regeneration processes have been previously described in the literature. For example, U.S. Pat. No. 4,873, 390 to Lewis et al. teaches a process for catalytically converting a feedstock into a product in which the feedstock is contacted with a partially regenerated catalyst. Lewis et al. describe that a partially regenerated catalyst improves the selectivity of the process to ethylene and propylene products.

U.S. Pat. No. 5,157,181 to Stine et al. discloses the use of a moving bed reactor. Catalyst is added to the reactor in a manner that is considered to be effective in enhancing conversion of feed to the desired product without enhancing conversion to by-product. This is accomplished in a preferred embodiment using a radial flow reactor design. Catalyst flows through an annulus in the reactor, with feed contacting the catalyst in a direction transverse to catalyst flow. The patent teaches that production of propane by-product decreases as the catalyst becomes deactivated. In accordance with this finding, it is generally suggested that regenerated catalyst that is recycled to the reactor should be added at an effective rate to provide sufficieny active sites to enhance the production of ethylene and propylene without enhancing the production to propane.

Bos et al., *Ind Eng. Chem. Res.*, 1995, 34, 3808–3806, disclose computer evaluations of commercial-scale reactor types that can be used in methanol-to-olefins processes. It was found that under certain conditions partially regenerated catalyst was more desirable for ethylene selectivity compared to a fully regenerated catalyst. It was uncertain, however, whether partially coked catalyst from a reactor was comparable to a partially decoked catalyst from a regenerator.

In converting oxygenate-containing feedstock to ethylene and propylene product, better selectivity to olefin product, as well as away from undesirable by-product, is still needed. It is particularly desirable to obtain product high in ethylene and/or propylene content, while reducing the amount of any one or more of the $C_1$–$C_4$ paraffin by-products.

SUMMARY OF THE INVENTION

This invention provides various embodiments in an improved making of making olefin product from an oxygenate feedstock. In one embodiment, the method comprises providing a silicoaluminophosphate (SAPO) molecular sieve catalyst; and contacting the catalyst with the oxygenate-containing feedstock in a fluidized bed reactor system with continual regeneration at an average catalyst feedstock exposure (ACFE) index of at least 1.0. As defined herein, the ACFE index is the total weight of oxygenate plus hydrocarbon fed to the reactor divided by the total weight of fresh and regenerated SAPO molecular sieve (i.e., excluding binder, inerts, etc., of the catalyst composition) sent to the reactor, both total weights measured over the same period of time. Fresh catalyst, as used herein, is catalyst that has not been previously used in a reaction process.

In another embodiment, the method comprises contacting the oxygenate-containing feedstock with a silicoaluminophosphate molecular sieve catalyst in a fluidized bed reactor system with continual regeneration under conditions effective to convert the feedstock to an olefin product; separating the olefin product from the catalyst; regenerating a portion of the separated catalyst; and contacting the regenerated catalyst with additional oxygenate-containing feedstock at an ACFE index of at least 1.0.

In yet another embodiment, the method comprises contacting the oxygenate-containing feedstock with a silicoaluminophosphate molecular sieve catalyst in a fluidized bed reactor system with continual regeneration under conditions effective to convert the feedstock to an olefin product; separating the olefin product from the catalyst, and separating the catalyst into a first catalyst portion and a second catalyst portion; regenerating the first catalyst portion under conditions effective to obtain a regenerated catalyst having a coke content of less than 2 wt. %; and combining the regenerated catalyst with the second catalyst portion and additional oxygenate-containing feedstock at an average catalyst feedstock exposure index of at least 1.0.

In another embodiment, the method comprises contacting the oxygenate-containing feedstock with a silicoaluminophosphate molecular sieve catalyst in a fluidized bed reactor system with continual regeneration under conditions effective to convert the feedstock to an olefin product; separating the olefin product from the catalyst, and separating the catalyst into a first catalyst portion and a second catalyst portion; regenerating the first catalyst portion under conditions effective to obtain a regenerated catalyst having a coke content of less than 2 wt. %; contacting the regenerated catalyst with the separated olefin under conditions effective to produce additional olefin product and to obtain a selectivated catalyst; and combining the selectivated catalyst with the second catalyst portion and additional oxygenate-containing feedstock under conditions effective to convert the additional oxygenate-containing feedstock to olefin product.

In still another embodiment, the method comprises providing a silicoaluminophosphate molecular sieve catalyst; and contacting the catalyst with the oxygenate-containing feedstock in a fluidized bed reactor system with continual regeneration at an average catalyst feedstock exposure index of at least 1.0, an average gas superficial velocity of greater than 1 meter per second, preferably greater than 2 meters per second, and under conditions effective to convert the oxygenate-containing feedstock to olefin product.

In still another embodiment, the method comprises providing a silicoaluminophosphate molecular sieve catalyst; contacting the catalyst with an oxygenate-containing feedstock in a fluidized bed reactor with continual regeneration at an average catalyst feedstock exposure (ACFE) index of at least 1.5, and under conditions effective to convert the oxygenate-containing feedstock to olefin product which contains a ratio of wt. % of propylene to wt. % of propane of at least 20.

In yet another embodiment, the method comprises providing a silicoaluminophosphate molecular sieve catalyst; contacting the catalyst with an oxygenate-containing feedstock in a fluidized bed reactor system with continual regeneration at an average catalyst feedstock exposure (ACFE) index of at least 1.5, including temperature and pressure conditions effective to convert the oxygenate-containing feedstock to olefin product; and separating the olefin product into at least two olefin fractions, with one of the fractions containing at least 95% propylene and at least 90% of the propane contained in the olefin product.

In the embodiments, the oxygenate-containing feedstock preferably comprises at least one compound selected from the group consisting of methanol; ethanol; n-propanol; iso-propanol; $C_4$–$C_{20}$ alcohols; methyl ethyl ether; dimethyl ether; diethyl ether; di-isopropyl ether; formaldehyde; dimethyl carbonate; dimethyl ketone; acetic acid; and mixtures thereof The silicoaluminophosphate catalyst is preferably comprised of a silicoaluminophosphate molecular sieve and a binder.

In a preferred embodiment, the silicoaluminophosphate molecular sieve is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, metal substituted forms thereof, and mixtures thereof.

The silicoaluminophosphate molecular sieve has a $Si/Al_2$ ratio of less than 0.65, preferably less than 0.4, in yet another preferred embodiment. In another preferred embodiment, the oxygenate-containing feedstock is contacted with the silicoaluminophosphate catalyst at 200–700° C., preferably at 400–600° C.

In another preferred embodiment, the oxygenate-containing feedstock is contacted with the silicoaluminophosphate catalyst in a reactor at an average gas superficial velocity of greater than 1 meter per second, preferably greater than 2 meters per second. It is also preferred in certain embodiments that the silicoaluminophosphate catalyst contacting the oxygenate feedstock contains an average level of 1.5–30 wt. % coke material.

BRIEF DESCRIPTION OF THE DRAWINGS

The present invention will be better understood by reference to the Detailed Description of the Invention when taken together with the attached drawings, wherein.

DETAILED DESCRIPTION OF THE INVENTION

Figure 1:
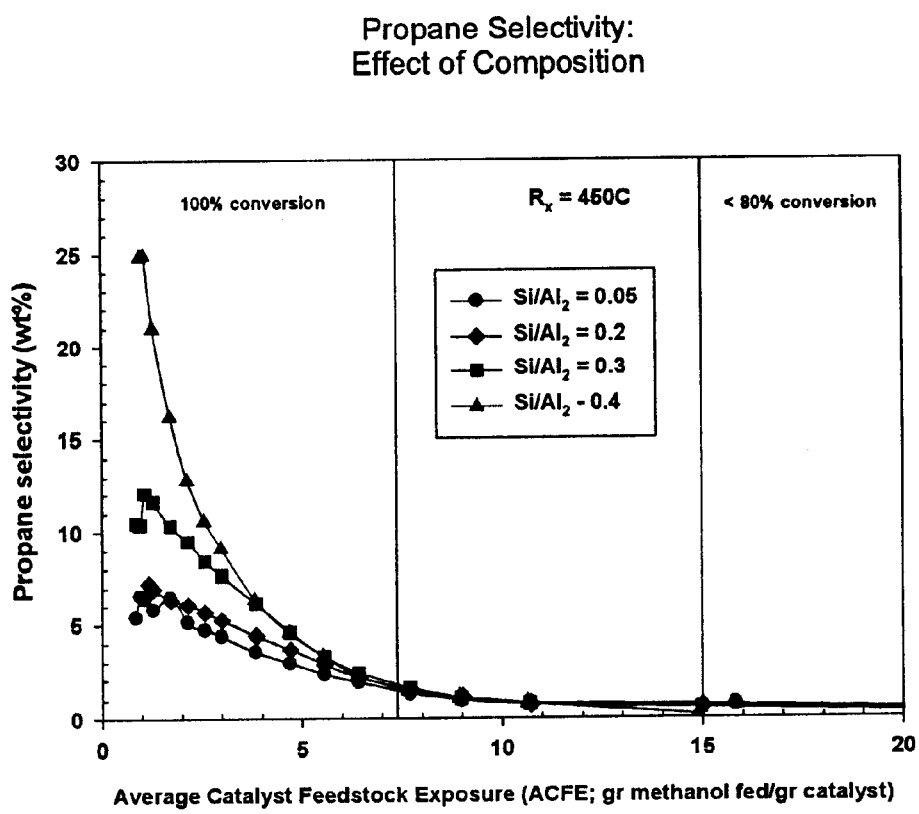
FIG. 1 is a graph which shows the effects of ACFE index on propane selectivity, and the related effects of catalysts having different $Si/Al_2$ ratios.

This invention is capable of providing an olefin product which is very low in $C_1$–$C_4$ paraffin content, and which produces less coke, It is particularly effective in converting oxygenate feedstock into olefin product having a very low propane content using a silicoaluminophosphate catalyst.

The oxygenate feedstock of this invention comprises at least one organic compound which contains at least one oxygen atom, such as aliphatic alcohols, ethers, carbonyl compounds (aldehydes, ketones, carboxylic acids, carbonates, esters and the like). When the oxygenate is an alcohol, the alcohol can include an aliphatic moiety having from 1 to 10 carbon atoms, more preferably from 1 to 4 carbon atoms. Representative alcohols include but are not necessarily limited to lower straight and branched chain aliphatic alcohols and their unsaturated counterparts. Examples of suitable oxygenate compounds include, but are not limited to: methanol; ethanol; n-propanol; isopropanol; $C_4$–$C_{20}$ alcohols; methyl ethyl ether; dimethyl ether; diethyl ether; di-isopropyl ether; formaldehyde; dimethyl carbonate; dimethyl ketone; acetic acid; and mixtures thereof. Preferred oxygenate compounds are methanol, dimethyl ether, or a mixture thereof The method of making the preferred olefin product in this invention can include the additional step of making these compositions from hydrocarbons such as oil, coal, tar sand, shale, biomass and natural gas. Methods for making the compositions are known in the art. These methods include fermentation to alcohol or ether, making synthesis gas, then converting the synthesis gas to alcohol or ether. Synthesis gas can be produced by known processes such as steam reforming, autothermal reforming and partial oxidization.

One or more inert diluents may be present in the feedstock, for example, in an amount of from 1 to 99 molar percent, based on the total number of moles of all feed and diluent components fed to the reaction zone (or catalyst). As defined herein, diluents are compositions which are essentially non-reactive across a molecular sieve catalyst, and primarily function to make the oxygenates in the feedstock less concentrated. Typical diluents include, but are not necessarily limited to helium, argon, nitrogen, carbon monoxide, carbon dioxide, water, essentially non-reactive paraffins (especially the alkanes such as methane, ethane, and propane), essentially non-reactive alkylenes, essentially non-reactive aromatic compounds, and mixtures thereof The preferred diluents are water and nitrogen. Water can be injected in either liquid or vapor form.

Hydrocarbons can also be included as part of the feedstock, i.e., as co-feed. As defined herein, hydrocarbons included with the feedstock are hydrocarbon compositions which are converted to another chemical arrangement when contacted with molecular sieve catalyst. These hydrocarbons can include olefins, reactive paraffins, reactive alkylaromatics, reactive aromatics or mixtures thereof Preferred hydrocarbon co-feeds include, propylene, butylene, pentylene, $C_4^+$ hydrocarbon mixtures, $C_5^+$ hydrocarbon mixtures, and mixtures thereof. More preferred as co-feeds are a $C_4^+$ hydrocarbon mixtures, with the most preferred being $C_4^+$ hydrocarbon mixtures which are obtained from separation and recycle of reactor product.

The catalyst that is used in this invention is one that incorporates a silicoaluminophosphate (SAPO) molecular sieve. The molecular sieve comprises a three-dimensional microporous crystal framework structure of [$SiO_2$], [$AlO_2$] and [$PO_2$] tetrahedral units. The way Si is incorporated into the structure can be determined by $^{29}Si$ MAS NMR. See Blackwell and Patton, *J. Phys. Chem.*, 92, 3965 (1988). The desired SAPO molecular sieves will exhibit one or more peaks in the $^{29}Si$ MAS NMR, with a chemical shift A(Si) in the range of –88 to –96 ppm and with a combined peak area in that range of at least 20% of the total peak area of all peaks with a chemical shift A(Si) in the range of –88 ppm to –115 ppm, where the A(Si) chemical shifts refer to external tetramethylsilane (TMS).

It is preferred that the silicoaluminophosphate molecular sieve used in this invention have a relatively low $Si/Al_2$ ratio. In general, the lower the $Si/Al_2$ ratio, the lower the $C_1$–$C_4$ saturates selectivity, particularly propane selectivity. A $Si/Al_2$ ratio of less than 0.65 is desirable, with a $Si/Al_2$ ratio of not greater than 0.40 being preferred, and a $Si/Al_2$ ratio of not greater than 0.32 being particularly preferred. A $Si/Al_2$ ratio of not greater than 0.20 is most preferred.

Silicoaluminophosphate molecular sieves are generally classified as being microporous materials having 8, 10, or 12 membered ring structures. These ring structures can have an average pore size ranging from about 3.5–15 angstroms. Preferred are the small pore SAPO molecular sieves having an average pore size ranging from about 3.5 to 5 angstroms, more preferably from 3.5 to 4.2 angstroms. These pore sizes are typical of molecular sieves having 8 membered rings.

In general, silicoaluminophosphate molecular sieves comprise a molecular framework of corner-sharing [$SiO_2$], [$AlO_2$], and [$PO_2$] tetrahedral units. This type of framework is effective in converting various oxygenates into olefin products.

The [$PO_2$] tetrahedral units within the framework structure of the molecular sieve of this invention can be provided by a variety of compositions. Examples of these phosphorus-containing compositions include phosphoric acid, organic phosphates such as triethyl phosphate, and aluminophosphates. The phosphorous-containing compositions are mixed with reactive silicon and aluminum-containing compositions under the appropriate conditions to form the molecular sieve.

The [$AlO_2$] tetrahedral units within the framework structure can be provided by a variety of compositions. Examples of these aluminum-containing compositions include aluminum alkoxides such as aluminum isopropoxide, aluminum phosphates, aluminum hydroxide, sodium aluminate, and pseudoboehmite. The aluminum-containing compositions are mixed with reactive silicon and phosphorus-containing compositions under the appropriate conditions to form the molecular sieve.

The [$SiO_2$] tetrahedral units within the framework structure can be provided by a variety of compositions. Examples of these silicon-containing compositions include silica sols and silicium alkoxides such as tetra ethyl orthosilicate. The silicon-containing compositions are mixed with reactive aluminum and phosphorus-containing compositions under the appropriate conditions to form the molecular sieve.

Substituted SAPOs can also be used in this invention. These compounds are generally known as MeAPSOs or metal-containing silicoaluminophosphates. The metal can be alkali metal ions (Group IA), alkaline earth metal ions (Group IIA), rare earth ions (Group IIIB, including the lanthanoid elements: lanthanum, cerium, praseodymium, neodymium, samarium, europium, gadolinium, terbium, dysprosium, holmium, erbium, thulium, ytterbium and lutetium; and scandium or yttrium) and the additional transition cations of Groups IVB, VB, VIB, VIIB, VIIIB, and IB.

Preferably, the Me represents atoms such as Zn, Mg, Mn, Co, Ni, Ga, Fe, Ti, Zr, Ge, Sn, and Cr. These atoms can be inserted into the tetrahedral framework through a [$MeO_2$] tetrahedral unit. The [$MeO_2$] tetrahedral unit carries a net electric charge depending on the valence state of the metal substituent. When the metal component has a valence state of +2, +3, +4, +5, or +6, the net electric charge is between –2 and +2. Incorporation of the metal component is typically accomplished adding the metal component during synthesis of the molecular sieve. However, post-synthesis ion exchange can also be used.

Suitable silicoaluminophosphate molecular sieves include SAPO-5, SAPO-8, SAPO-11, SAPO-16, SAPO-17, SAPO- 18, SAPO-20, SAPO-31, SAPO-34, SAPO-35, SAPO-36, SAPO-37, SAPO-40, SAPO-41, SAPO-42, SAPO-44, SAPO-47, SAPO-56, the metal containing forms thereof, and mixtures thereof. Preferred are SAPO-18, SAPO-34, SAPO-35, SAPO-44, and SAPO-47, particularly SAPO-18 and SAPO-34, including the metal containing forms thereof, and mixtures thereof. As used herein, the term mixture is synonymous with combination and is considered a composition of matter having two or more components in varying proportions, regardless of their physical state.

An aluminophosphate (ALPO) molecular sieve structure can also be interspersed with the SAPO molecular sieves. Aluminophosphate molecular sieves are crystalline microporous oxides which can have an AlPO$_4$ framework. They can have additional elements within the framework, typically have uniform pore dimensions ranging from about 3 angstroms to about 10 angstroms, and are capable of making size selective separations of molecular species. More than two dozen structure types have been reported, including zeolite topological analogues. A more detailed description of the background and synthesis of aluminophosphates is found in U.S. Pat. No. 4,310,440, which is incorporated herein by reference in its entirety. Preferred ALPO structures are ALPO-5, ALPO-11, ALPO-18, ALPO-31, ALPO-34, ALPO-36, ALPO-37, and ALPO-46.

The ALPOs can also include a metal substituent in its framework. Preferably, the metal is selected from the group consisting of magnesium, manganese, zinc, cobalt, and mixtures thereof. These materials preferably exhibit adsorption, ion-exchange and/or catalytic properties similar to aluminosilicate, aluminophosphate and silica aluminophosphate molecular sieve compositions. Members of this class and their preparation are described in U.S. Pat. No. 4,567,029, incorporated herein by reference in its entirety.

The metal containing ALPOs have a three-dimensional microporous crystal framework structure of MO$_2$, AlO$_2$ and PO$_2$ tetrahedral units. These as manufactured structures (which contain template prior to calcination) can be represented by empirical chemical composition, on an anhydrous basis, as:

$$mR:(M_xAl_yP_z)O_2$$

wherein "R" represents at least one organic templating agent present in the intracrystalline pore system; "m" represents the moles of "R" present per mole of $(M_xAl_yP_z)O_2$ and has a value of from zero to 0.3, the maximum value in each case depending upon the molecular dimensions of the templating agent and the available void volume of the pore system of the particular metal aluminophosphate involved, "x", "y", and "z" represent the mole fractions of the metal "M", (i.e. magnesium, manganese, zinc and cobalt), aluminum and phosphorus, respectively, present as tetrahedral oxides.

The metal containing ALPOs are sometimes referred to by the acronym as MeAPO. Also in those cases where the metal "Me" in the composition is magnesium, the acronym MAPO is applied to the composition. Similarly ZAPO, MnAPO and CoAPO are applied to the compositions which contain zinc, manganese and cobalt respectively. To identify the various structural species which make up each of the subgeneric classes MAPO, ZAPO, CoAPO and MnAPO, each species is assigned a number and is identified, for example, as ZAPO-5, MAPO-11, CoAPO-34 and so forth.

The silicoaluminophosphate molecular sieves are synthesized by hydrothermal crystallization methods generally known in the art. See, for example, U.S. Pat. Nos. 4,440,871; 4,861,743; 5,096,684; and 5,126,308, the methods of making of which are fully incorporated herein by reference. A reaction mixture is formed by mixing together reactive silicon, aluminum and phosphorus components, along with at least one template. Generally the mixture is sealed and heated, preferably under autogenous pressure, to a temperature of at least 100° C., preferably from 100–250° C., until a crystalline product is formed. Formation of the crystalline product can take anywhere from around 2 hours to as much as 2 weeks. In some cases, stirring or seeding with crystalline material will facilitate the formation of the product.

The reaction mixture can contain one or more templates. Templates are structure directing agents, and typically contain nitrogen, phosphorus, oxygen, carbon, hydrogen or a combination thereof, and can also contain at least one alkyl or aryl group, with 1 to 8 carbons being present in the alkyl or aryl group. Mixtures of two or more templates can produce mixtures of different sieves or predominantly one sieve where one template is more strongly directing than another.

Representative templates include tetraethyl ammonium salts, cyclopentylamine, aminomethyl cyclohexane, piperidine, triethylamine, cyclohexylamine, tri-ethyl hydroxyethylamine, morpholine, dipropylamine (DPA), pyridine, isopropylamine and combinations thereof Preferred templates are triethylamine, cyclohexylamine, piperidine, pyridine, isopropylamine, tetraethyl ammonium salts, and mixtures thereof. The tetraethylammonium salts include tetraethyl ammonium hydroxide (TEAOH), tetraethyl ammonium phosphate, tetraethyl ammonium fluoride, tetraethyl ammonium bromide, tetraethyl ammonium chloride, tetraethyl ammonium acetate. Preferred tetraethyl ammonium salts are tetraethyl ammonium hydroxide and tetraethyl ammonium phosphate.

Typically, the molecular sieve product will be formed in solution. It can be recovered by standard means, such as by centrifugation or filtration. The product can also be washed, recovered by the same means and dried.

As a result of the crystallization process, the recovered sieve contains within its pores at least a portion of the template used in making the initial reaction mixture. The crystalline structure essentially wraps around the template, and the template must be removed so that the molecular sieve can exhibit catalytic activity. Once the template is removed, the crystalline structure that remains has what is typically called an intracrystalline pore system.

In many cases, depending upon the nature of the final product formed, the template may be too large to move freely through the intracrystalline pore system. In such a case, the template can be removed by a heat treatment process. For example, the template can be calcined, or essentially combusted, in the presence of an oxygen-containing gas, by contacting the template-containing sieve in the presence of the oxygen-containing gas and heating at temperatures from 200° C. to 900° C. In some cases, it may be desirable to heat in an environment having a low oxygen concentration. In these cases, however, the result will typically be a breakdown of the template into a smaller component, rather than by the combustion process. This type of process can be used for partial or complete removal of the template from the intracrystalline pore system. In other cases, with smaller templates, complete or partial removal from the sieve can be accomplished by conventional desorption processes such as those used in making standard zeolites.

The silicoaluminophosphate molecular sieve is typically admixed (i.e., blended) with other materials. When blended, the resulting composition is typically referred to as a SAPO catalyst, with the catalyst comprising the SAPO molecular sieve.

Materials which can be blended with the molecular sieve can be various inert or catalytically active materials, or various binder materials. These materials include compositions such as kaolin and other clays, various forms of rare earth metals, other non-zeolite catalyst components, zeolite catalyst components, alumina or alumina sol, titania, zirconia, quartz, silica or silica or silica sol, and mixtures thereof These components are also effective in reducing overall catalyst cost, acting as a thermal, sink to assist in heat shielding the catalyst during regeneration, densifying the catalyst and increasing catalyst strength. The amount of molecular sieve which is contained in the final molecular sieve catalyst product ranges from 10 to 90 weight percent of the total catalyst, preferably 30 to 70 weight percent of the total catalyst.

Additional molecular sieve materials can be included as a part of the SAPO catalyst composition or they can be used as separate molecular sieve catalysts in admixture with the SAPO catalyst if desired. Several types of molecular sieves exist, each of which exhibit different properties. Structural types of small pore molecular sieves that are suitable for use in this invention include AEI, AFT, APC, ATN, ATT, ATV, AWW, BIK, CAS, CHA, CHI, DAC, DDR, EDI, ERI, GOO, KFI, LEV, LOV, LTA, MON, PAU, PHI, RHO, ROG, THO, and substituted form's thereof. Structural types of medium pore molecular sieves that are suitable for use in this invention include MFI, MEL, MTW, EUO, MTT, HEU, FER, AFO, AEL, TON, and substituted forms thereof. These small and medium pore molecular sieves are described in greater detail in the Atlas of *Zeolite Structural Types*, W. M. Meier and D. H. Olsen, Butterworth Heineman, 3rd ed., 1997, the detailed description of which is explicitly incorporated herein by reference. Preferred molecular sieves which can be combined with a silicoaluminophosphate catalyst include ZSM-5, ZSM-34, erionite, and chabazite.

In this invention, a feed containing an oxygenate, and optionally a hydrocarbon either added separately or mixed with the oxygenate, is contacted with a catalyst containing a SAPO molecular sieve at process conditions effective to produce olefins. The volume in which such contact takes place is herein termed the "reactor," which is a part of a "reactor apparatus" or "reaction system" or "reactor system." Another part of the reaction system can be a "regenerator," which comprises a volume wherein coke deposits (or coke) on the catalyst resulting from the olefin conversion reaction are removed by contacting the catalyst with regeneration medium.

In the process of this invention, part of the coked catalyst within the reactor is withdrawn from the reactor and continually regenerated by contact with a regeneration medium to remove all or part of such coke deposits. The regenerated catalyst is subsequently reintroduced to the reactor. Such continual regeneration occurs at times and conditions needed to maintain a level of activity of the entire catalyst within the reactor. While the regeneration step in this process is continual, when viewing the process over long enough period of time to effect many regeneration and/or reaction steps, the overall process for catalyst regeneration and the production of olefins is essentially continuous. Further, the rate of deactivated catalyst sent to the regenerator from the reactor and the rate of regenerated catalyst sent to the reactor from the regenerator are about the same over a long enough period of time, and the overall process for the production of olefins is essentially continuous.

Flow rate of catalyst can be measured in a variety of ways. In the design of the equipment used to carry the catalyst between the reactor and regenerator, the catalyst flow rate can be determined given the coke production rate in the reactor, the average coke level on catalyst leaving the reactor, and the average coke level on catalyst leaving the regenerator. In an operating unit with continuous catalyst flow, a variety of measurement techniques can be used. Many such techniques are described, for example, by Michel Louge, "Experimental Techniques," *Circulating Fluidized Beds*, Grace, Avidan, & Knowlton, eds., Blackie, 1997 (336–337), the descriptions of which are expressly incorporated herein by reference.

Catalyst that has been contacted with feed in a reactor is defined herein as "feedstock exposed." Feedstock exposed catalyst will provide olefin conversion reaction products having substantially lower propane and coke yield than a catalyst which is fresh or regenerated. A catalyst will typically provide lower amounts of light alkanes, especially propane, as it is exposed to more feed, either through increasing time at a given feed rate or increasing feed rate over a given time.

At any given instant in time, some of the catalyst in the reactor may be fresh, some will be newly regenerated as a result of having just been introduced from the regenerator, and the balance will be coked or partially coked as a result of having been in the reactor for a variety of times after having been introduced from the regenerator. Therefore, various portions of the catalyst in the reactor will have been feedstock exposed for different periods of time. Also, since the rate at which feed flows to the reactor can vary, the amount of feed to which various portions of the catalyst have been exposed can vary. To account for this variation, the "average catalyst feedstock exposure index (ACFE index)" is used to quantitatively define the extent to which the entire catalyst in the reactor has been feedstock exposed.

As defined herein, the ACFE index is the total weight of oxygenate plus hydrocarbon fed to the reactor divided by the total weight of fresh and regenerated SAPO molecular sieve (i.e., excluding binder, inerts, etc., of the catalyst composition) sent to the reactor, both total weights measured over the same period of time. Fresh catalyst, as used herein, is catalyst that has not been previously used in a reaction process. To determine the ACFE index, the weight of oxygenate and hydrocarbon sent to the reactor and the weight of fresh and regenerated SAPO molecular sieve sent to the reactor should be made over an equivalent time interval. The time interval should be long enough to smooth out fluctuations in catalyst or feedstock rates according to the reactor and regeneration process step selected to allow the system to viewed as essentially continuous. In the case of reactor systems with substantially constant regeneration, hours or days are usually sufficient.

In this invention, only the molecular sieve in the catalyst sent to the reactor may be used in the determination of ACFE index. The catalyst sent to the reactor, however, can be either fresh or regenerated or a combination of both. Molecular sieve which may be recirculated to and from the reactor within the reactor apparatus (i.e., via ducts, pipes or annular regions), and which has not been regenerated or does not contain fresh catalyst, is not to be used in the determination of ACFE index.

In the process of this invention, a feed containing an oxygenate, and optionally a hydrocarbon, either separately or mixed with the oxygenate, is contacted with a catalyst containing a SAPO molecular sieve at process conditions effective to produce olefins in a reactor where the catalyst has an ACFE index of at least about 1.0, preferably at least 1.5, more preferably about 2.0, and most preferably about 3.0. An ACFE index in the range of about 1.0 to 50 is effective, with a range of about 1.5–20 being desirable. A range of about 2–12 is particularly preferred. The invention substantially reduces the yield of coke, propane and other low value saturated by-products from an oxygenate conversion process compared to previously disclosed processes.

In this invention, a feed containing an oxygenate is contacted in a reaction zone of a reactor apparatus with a molecular sieve catalyst at process conditions effective to produce olefins, i.e., an effective temperature, pressure, WHSV (weight hour space velocity) and, optionally, an effective amount of diluent, correlated to produce olefins, particularly ethylene and propylenes, i.e., ethylene and/or propylene. These conditions are described in detail below. Usually, the oxygenate feed is contacted with the catalyst when the oxygenate is in a vapor phase. Alternately, the process may be carried out in a liquid or a mixed vapor/liquid phase. When the process is carried out in a liquid phase or a mixed vapor/liquid phase, different conversions and selectivities of feed-to-product may result depending upon the catalyst and reaction conditions.

The process can generally be carried out at a wide range of temperatures. An effective operating temperature range can be from about 200° C. to 700° C., preferably from about 300° C. to 600° C., more preferably from about 350° C. to 550° C. At the lower end of the temperature range, the formation of the desired olefin products may become markedly slow. At the upper end of the temperature range, the process may not form an optimum amount of product.

The conversion of oxygenates to produce ethylene and propylenes should be carried out in a fluidized bed reactor with continual regeneration. These types, of reactors include fluid bed reactors and concurrent riser reactors as described in "Free Fall Reactor," *Fluidization Engineering*, D. Kunii and O. Levenspiel, Robert E. Krieger Publishing Co. NY, 1977, expressly incorporated herein by reference. Additionally, countercurrent free fall reactors may be used in the conversion process as described in U.S. Pat. No. 4,068, 136 and "Riser Reactor", *Fluidization and Fluid-Particle Systems*, pages 48–59, F. A. Zenz and D. F. Othmo, Reinhold Publishing Corp., NY 1960, the detailed descriptions of which are also expressly incorporated herein by reference. It is well understood by those skilled in the art that each type of reactor will have advantages and disadvantages in any particular application.

When the reactor is a fluidized bed reactor, the reactor may optionally have a riser region and a dense fluid bed section. In this embodiment, the regenerated catalyst can be returned to the portion of the reactor above the dense phase region, immediately below the dense phase region, or anywhere between about the top one fourth of the riser region and the bottom one fourth of the dense phase region.

Any fluidized bed reactor system with continual regeneration can be used, with a weight hourly space velocity (WHSV) of from 1 $hr^{-1}$ to 1000 $hr^{-1}$, with WHSV being defined as the weight of oxygenate, and hydrocarbon which may optionally be in the feed, per hour per weight of the molecular sieve content of the catalyst. Preferred reactors are co-current riser reactors and short contact time countercurrent free-fall reactors in which an oxygenate feedstock can be contacted with a molecular sieve catalyst at a WHSV of at least about 20 $hr^{-1}$, preferably in the range of from about 20 $hr^{-1}$ to 1000 $hr^{-1}$, and most preferably in the range of from about 20 $hr^{-1}$ to 500 $hr^{-1}$. Because the catalyst or the feedstock may contain other materials which act as inerts or diluents, the WHSV is calculated on the weight basis of the oxygenate feed, and any hydrocarbon which may be present, and the molecular sieve contained in the catalyst.

The pressure also may vary over a wide range. System pressures are in the range of from about 0.1 psia to about 1,000 psia. Preferred pressures are in the range of about 10 psia to about 500 psia, with the most preferred range being of from about 15 psia to about 200 psia. The foregoing pressures are exclusive of any inert diluent.

The residence time of the feed may vary from fractions of a second to a number of hours, determined largely by the reaction temperature, the pressure, the molecular sieve catalyst selected, the WHSV, the phase (liquid or vapor), and the process design characteristics.

In a preferred embodiment of the continuous operation, only a portion of the catalyst is removed from the reactor and sent to the regenerator to remove the accumulated coke deposits that result during the catalytic reaction. In the regenerator, the catalyst is contacted with a regeneration medium containing oxygen or other oxidants. Examples of other oxidants include $O_3$, $SO_3$, $N_2O$, NO, $NO_2$, $N_2O_5$, and mixtures thereof. It is preferred to supply $O_2$ in the form of air. The air can be diluted with nitrogen, $CO_2$, or flue gas, and steam may be added. Desirably, the $O_2$ concentration in the regenerator is reduced to a controlled level to minimize overheating or the creation of hot spots in the spent or deactivated catalyst. The deactivated catalyst also may be regenerated reductively with $H_2$, CO, mixtures thereof, or other suitable reducing agents. A combination of oxidative regeneration and reductive regeneration can also be employed.

In essence, the coke deposits are removed from the catalyst during the regeneration process, forming a regenerated catalyst. The regenerated catalyst is then returned to the reactor for further contact with feed. Typical regeneration temperatures are in the range of 250–700° C., desirably in the range of 350–700° C. Preferably, regeneration is carried out at a temperature range of 450–700° C.

It is desirable to strip at least some of the volatile organic components which may be adsorbed onto the catalyst or located within its microporous structure prior to entering the regenerator. This can be accomplished by passing a stripping gas over the catalyst in a stripper or stripping chamber, which can be located within the reactor or in a separate vessel. The stripping gas can be any substantially inert medium that is commonly used. Examples of stripping gas are steam, nitrogen, helium, argon, methane, $CO_2$, CO, flue gas, and hydrogen.

It may be desirable to cool at least a portion of the regenerated catalyst to a lower temperature before it is sent back to the reactor. A heat exchanger located externally to the regenerator may be used to remove some heat from the catalyst after it has been withdrawn from the regenerator. When the regenerated catalyst is cooled, it is desirable to cool it to a temperature which is from about 200° C. higher to about 200° C. lower than the temperature of the catalyst withdrawn from the reactor. More desirably, it is cooled to a temperature from about 10–200° C. lower than the temperature of the catalyst withdrawn from the reactor. This cooled catalyst then may be returned to either some portion of the reactor, the regenerator, or both. When the regenerated catalyst from the regenerator is returned to the reactor, it may be returned to the reactor's catalyst disengaging zone, the reaction zone, and/or the inlet zone. Introducing the cooled catalyst into the reactor or regenerator serves to reduce the average temperature in the reactor or regenerator.

In one embodiment, the reactor and regenerator are configured such that the feed contacts the regenerated catalyst before it is returned to the reactor. In an alternative embodiment, the reactor and regenerator are configured such that the feed contacts the regenerated catalyst after it is returned to the reactor. In yet another embodiment, the feed stream can be split such that feed contacts regenerated catalyst before it is returned to the reactor and after it has been returned to the reactor.

According to one of the preferred embodiments of this invention, the catalyst within the reactor has an average level of coke effective for selectivity to ethylene and/or propylene. Preferably, the average coke level on the catalyst will be from about 2 wt. % to about 30 wt. %, more preferably from about 2 wt. % to about 20 wt. %. In order to maintain this average level of coke on catalyst, and maintain preferred ACFE, it is preferred to recycle only a portion of the coked catalyst for feed contact without regenerating. This recycle can be performed either internal or external to the reactor. The portion of coked catalyst to be regenerated is preferably regenerated under conditions effective to obtain a regenerated catalyst having a coke content of less than 2 wt. %, preferably less than 1.5 wt. %, and most preferably less than 1.0 wt. %, with the preferred ACFE index also being met.

In another preferred embodiment of this invention, at least a portion of the olefin product stream is contacted with at least a portion of the regenerated catalyst. This exposure can occur either in the reactor or in a vessel separate from the reactor. It is preferable that lighter olefin products (i.e., ethylene and propylene) be separated from the higher boiling point by-products, and the higher boiling point by-products (i.e., higher than the boiling point of propylene) be contacted with the regenerated catalyst. These higher boiling point by-products include $C_4^+$ olefins as well as the higher boiling point paraffins. When the olefin product stream or the separated higher boiling point by-product stream is contacted with the catalyst under typical reactor conditions, a significant portion of the by-products will be converted to lower olefins, increasing the overall lower olefin product yield. In another embodiment, the initial contact is achieved by sending the regenerated catalyst to a location within the reactor in which there are higher boiling point by-products, optionally mixed with lighter olefin products. After contact, this catalyst is preferably mixed with the rest of the catalyst in the reactor and the mixture is contacted with feedstock.

In yet another preferred embodiment of the invention, an average gas superficial velocity, including any diluents present in the feedstock, is maintained at a rate greater than 1 meter per second (m/s) at any point in the reactor. Desirably, the gas superficial velocity is greater than about 2 m/s. More desirably, the gas superficial velocity is greater than about 2.5 m/s. Even more desirably, the gas superficial velocity is greater than about 4 m/s. Most desirably, the gas superficial velocity is greater than about 8 m/s.

As used herein and in the claims, the term, "gas superficial velocity," is defined as the volumetric flow rate of vaporized feedstock, and any vapor diluent, divided by the reactor cross-sectional area. Because the oxygenate is converted to a product including a ethylene and propylene while flowing through the reactor, the gas superficial velocity may vary at different locations within the reactor depending on the total number of moles of gas present and the cross section of a particular location in the reactor, temperature, pressure, and other relevant reaction parameters.

Maintaining the gas superficial velocity at these rates increases the approach to plug flow behavior of the gases flowing in the reactor. As the gas superficial velocity increases above about 1 m/s, a reduction in axial diffusion or backmixing of the gases results from a reduction in internal recirculation of solids, which carry gas with them. (Ideal plug flow behavior occurs when elements of the homogeneous fluid reactant move through a reactor as plugs moving parallel to the reactor axis). Minimizing the backmixing of the gases in the reactor increases the selectivity to the desired ethylene and propylenes in the oxygenate conversion reaction.

The process of this invention will provide an olefin product low in $C_1$–$C_4$ paraffin content, particularly one low in propane content. Generally, increases in ACFE of the catalyst decrease the production of propane generated in the oxygenate conversion reaction. In another embodiment of this invention, the ACFE of the catalyst to which oxygenate feedstock is converted to olefin product is selected to produce an olefin product containing a ratio of wt. % propylene to wt. % of propane of at least 20. The extent of ACFE required will vary according to the exact catalyst utilized, and the choice of other operating of other conditions such as temperature, oxygenate feed partial pressure and WHSV, and others, but in general, an ACFE of at least 1.5 will be selected.

In yet another embodiment of this invention, an olefin product produced at an ACFE of at least 1.5 will be sent to an olefin recovery facility, wherein several streams of olefins of predominantly one carbon number, for example, ethylene or ethane or a mixture thereof, and propylene or propane or a mixture thereof, will be produced by conventional fractional distillation techniques (fractionation). Preferably, fractionation is such that one of the fractionation streams comprises at least 95 wt. % propylene and at least 90% of all the propane contained in the olefin product coming from the reactor. Preferably, the fraction stream is generated by fractionating the $C_2$ and lighter molecules from the $C_3$ molecules and fractionating the $C_4$ and heavier molecules from the $C_3$ molecules, in any order. Other purification steps may be employed in this embodiment at any point, including removal of low-level contaminants such as oxygenates or acetylenes or dienes, and other fractionation steps may be employed, such as those to separate $C_1$ and lighter components from the $C_2$ and heavier molecules. However, the propylene product stream of this embodiment of the present invention typically comes as the product of a fractionation device separating $C_2$ from $C_3$ or one separating $C_3$ from $C_4$, and not one involved in separating propylene from propane. In practicing this embodiment, a propylene product stream of sufficiently high purity may be produced for use in the manufacture of various propylene derivative products without performing a separation of propylene from propane. Optionally, the propylene product stream may subsequently be sent to another separation device to separate propylene from propane to generate a second propylene product stream having an increased content of propylene.

One skilled in the art will also appreciate that the olefins produced by the oxygenate-to-olefin conversion reaction of the present invention can be polymerized to form polyolefins, particularly polyethylene and polypropylene. Processes for forming polyolefins from olefins are known in the art. Catalytic processes are preferred. Particularly preferred are metallocene, Ziegler/Natta and acid catalytic systems. See, for example, U.S. Pat. Nos. 3,258,455; 3,305, 538; 3,364,190; 5,892,079; 4,659,685; 4,076,698; 3,645, 992; 4,302,565; and 4,243,691, the catalyst and process descriptions of each being expressly incorporated herein by reference. In general, these methods involve contacting the olefin product with a polyolefin-forming catalyst at a pressure and temperature effective to form the polyolefin product.

A preferred polyolefin-forming catalyst is a metallocene catalyst. The preferred temperature range of operation is between 50 and 240° C. and the reaction can be carried out at low, medium or high pressure, being anywhere within the range of about 1 to 200 bars. For processes carried out in solution, an inert diluent can be used, and the preferred operating pressure range is between 10 and 150 bars, with a preferred temperature range of between 120 and 230° C. For gas phase processes, it is preferred that the temperature generally be within a range of 60 to 160° C., and that the operating pressure be between 5 and 50 bars.

In addition to polyolefins, numerous other olefin derivatives may be formed from the olefins produced by the process of the present invention or olefins recovered therefrom. These include, but are not limited to, aldehydes, alcohols, acetic acid, linear alpha olefins, vinyl acetate, ethylene dichloride and vinyl chloride, ethylbenzene, ethylene oxide, cumene, isopropyl alcohol, acrolein, allyl chloride, propylene oxide, acrylic acid, ethylene-propylene rubbers, and acrylonitrile, and oligomers of ethylene, propylene or butylenes. The methods of manufacturing these derivatives are well known in the art, and therefore are not discussed here.

This invention will be better understood with reference to the following examples, which are intended to illustrate specific embodiments within the overall scope of the invention as claimed.

General Experimental Procedure

In Examples 1–2, the effect of average catalyst feedstock exposure index on propane selectivity was determined using SAPO-34 catalyst having a particle size of 40–60 U.S. mesh (250–420 μm). The catalyst was diluted with silicon carbide having a particle size of 35 U.S. mesh (500 μm) at a catalyst/diluent weight ratio of 1:17. The catalyst was activated in-situ under nitrogen (50cc/min) at 625° C. for one hour.

The reactor was a stainless steel, continuous reactor, ½ inch I.D. and 23.6 inches long. A three-zone furnace heated the reactor, and a Moore 360 SU-L pressure regulator was used to control reactor pressure at the outlet. From the reactor outlet, an electrically heat traced transfer line was used to transfer product to an on-line GC. The online GC was equipped with a FID and TCD detector. Product verification was performed using a PoraPLOT QHT GC column.

Methanol or a methanol water mixture (80/20 wt. ratio) was fed to the reactor using a syringe pump. The feed was pre-heated in the first reaction zone of the furnace before entering the reactor.

In Examples 1–2, the average catalyst feedstock exposure index (ACFE index) was calculated as weight hourly space velocity (WHSV) times the time on stream. WHSV is defined as the total weight of the feedstock fed to the reactor on a per hour basis divided by the weight of silicoaluminophosphate molecular sieve in the reactor. Time on stream is the total amount of time (in hours) that methanol has been fed to the reactor at any point during the test.

EXAMPLE 1

Methanol was reacted using samples of SAPO-34 as the catalyst. The samples had $Si/Al_2$ ratios of 0.05, 0.2, 0.3, and 0.4. The reactions were carried out at 25 psig (272 kPa) and 450° C. WHSV was set at 25 $hr^{-1}$. Wt. % propane in the product was measured, and selectivity was calculated as wt. % yield divided by the fractional conversion of methanol. Average catalyst feedstock exposure index was calculated and the results were plotted. The results are shown in FIG. 1. FIG. 1 shows that the higher the average catalyst feedstock exposure index, the lower the propane selectivity. An average catalyst feedstock exposure index of less than 1.0 at any of the given $Si/Al_2$ ratios is undesirable.

EXAMPLE 2

The following process conditions were evaluated for effect on average catalyst feedstock exposure index: (a) water content of methanol to simulate crude methanol (methanol/water weight ratio of 80:20); (b) total pressure; and (c) WHSV. The process conditions are summarized in Table 1.

TABLE 1

| Designator | Total Pressure (psig) | Methanol/$H_2O$ (weight ratio) | WHSV ($hr^{-1}$) |
|---|---|---|---|
| Standard w/o $H_2O$ | 25 | 100 | 25 |
| Standard w/$H_2O$ | 25 | 80/20 | 25 |
| Hi space velocity | 25 | 80/20 | 38 |
| Low Pressure | 15 | 80/20 | 25 |
| High space/low Pressure | 15 | 80/20 | 38 |
| Low space/low Pressure | 15 | 80/20 | 17 |
| Higher space/low Pressure | 15 | 80/20 | 92 |

Figure 2:
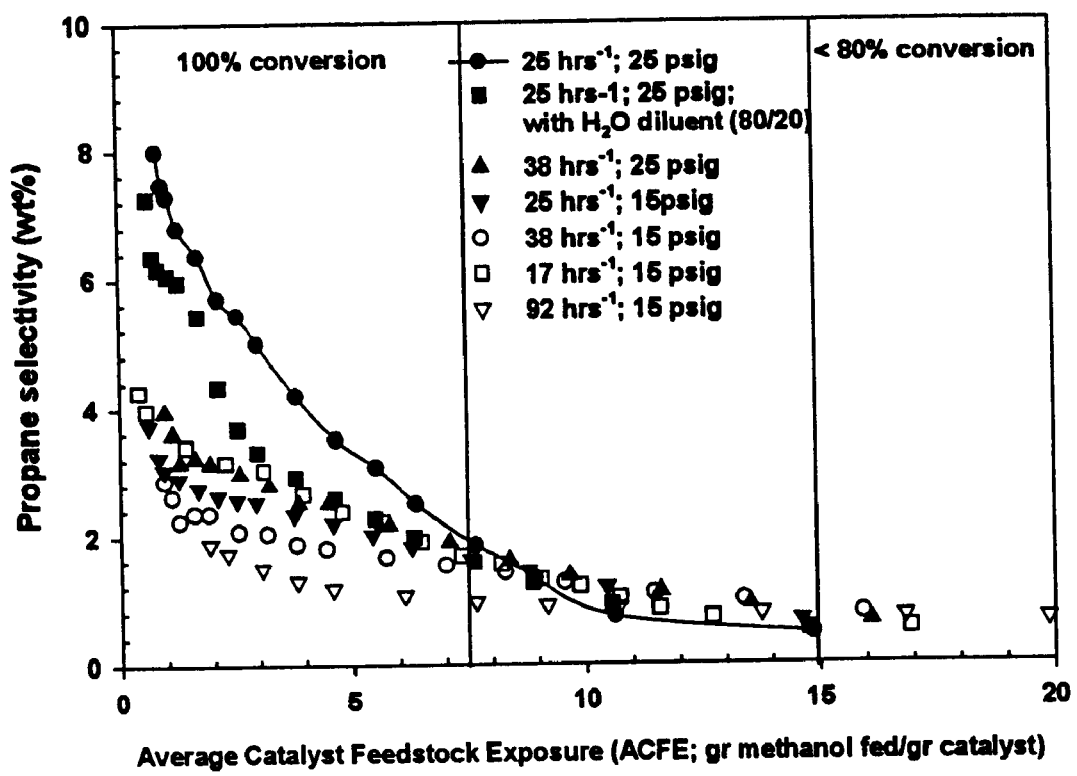
FIG. 2 is a graph which shows the effects of ACFE index on propane selectivity, and the related effects of methanol partial pressure.

The reactions were carried out using SAPO-34 catalyst having a $Si/Al_2$ ratio of 0.3. The temperature was maintained at 475° C. Wt. % propane in the product was measured, and selectivity was calculated as wt. % yield divided by the fractional conversion of methanol. Average catalyst feedstock exposure index was calculated and the results were plotted. The results are shown in FIG. 2. FIG. 2 shows that lower methanol partial pressure and high weight hourly space velocity favor lower propane formation. An average catalyst feedstock exposure index of less than 1.0 at any of the given variable conditions is undesirable.

EXAMPLE 3

A fluidized-batch-recirculating (FBR) reactor, which simulates the reaction condition in the riser, was used to analyze coke yield on feed in the methanol to olefins (MTO) reaction using a catalyst containing 50% SAPO34, the remainder being binder material. 0.75 grams of catalyst were loaded in a basket, each end of the basket being covered with porous metal disks to allow gas to circulate in a manner to fluidize the catalyst in the basket. The reactor was first pressurized to 60–70 psia (412–481 kPa) with argon gas, an impeller was turned on, and the gas circulated for 10 seconds to allow the catalyst to reach a fluidized state. 0.2 cc of methanol was injected into the circulating gas at 450–500 C achieving a partial pressure of methanol Was 40–42.8 psia (275 to 294 kPa). The reaction time (gas residence time) was computer controlled. In this experiment, the reaction time was 12.8 seconds. Product was removed from the reactor to a vacuum vessel through an automated valve. An on-line GC was used to analyze the reaction products. Coke on catalyst was analyzed by TPO. Percent coke yield was calculated by dividing the weight of coke on the catalyst by the amount of methanol introduced into the reactor as $CH_2$, (not as $CH_4OH$) since one mole of water is generated from one mole of methanol in the MTO reaction and the water does not contribute to the hydrocarbon product or the coke on the catalyst. The coked catalyst could be regenerated in its fluidized state with a gas stream containing oxygen at a temperature range of 450–650 C. The regenerated catalyst was re-exposed to the same amount of methanol at the same reaction condition to provide continuous reaction-regeneration cycles. The ACFE under this reaction-regeneration scheme is calculated as (0.2 cm³)*(0.7914 g/cm³)/[(0.75 g)*0.5]=0.42.

If after the product analysis of the 1$^{st}$ methanol injection, no regeneration was carried out on the catalyst, but a second methanol injection was introduced into the reactor, the ACFE under this reaction-regeneration scheme is calculated as 2*(0.2 cm³)*(0.7914 g/cm³)/[(0.75 g)*0.5]=0.84.

The average coke yield after two methanol injections is calculated with the measured coke, using TPO to determine the amount of coke on the catalyst which has been exposed to two methanol injections, and the total amount of methanol introduced into the reactor as $CH_2$. Therefore, when "n" is the number of methanol injection before catalyst regeneration the formula for ACFE is n*(0.2 cm³)*(0.7914 g/cm³)/[(0.75 g)*0.5]=0.42 n.

Figure 3:
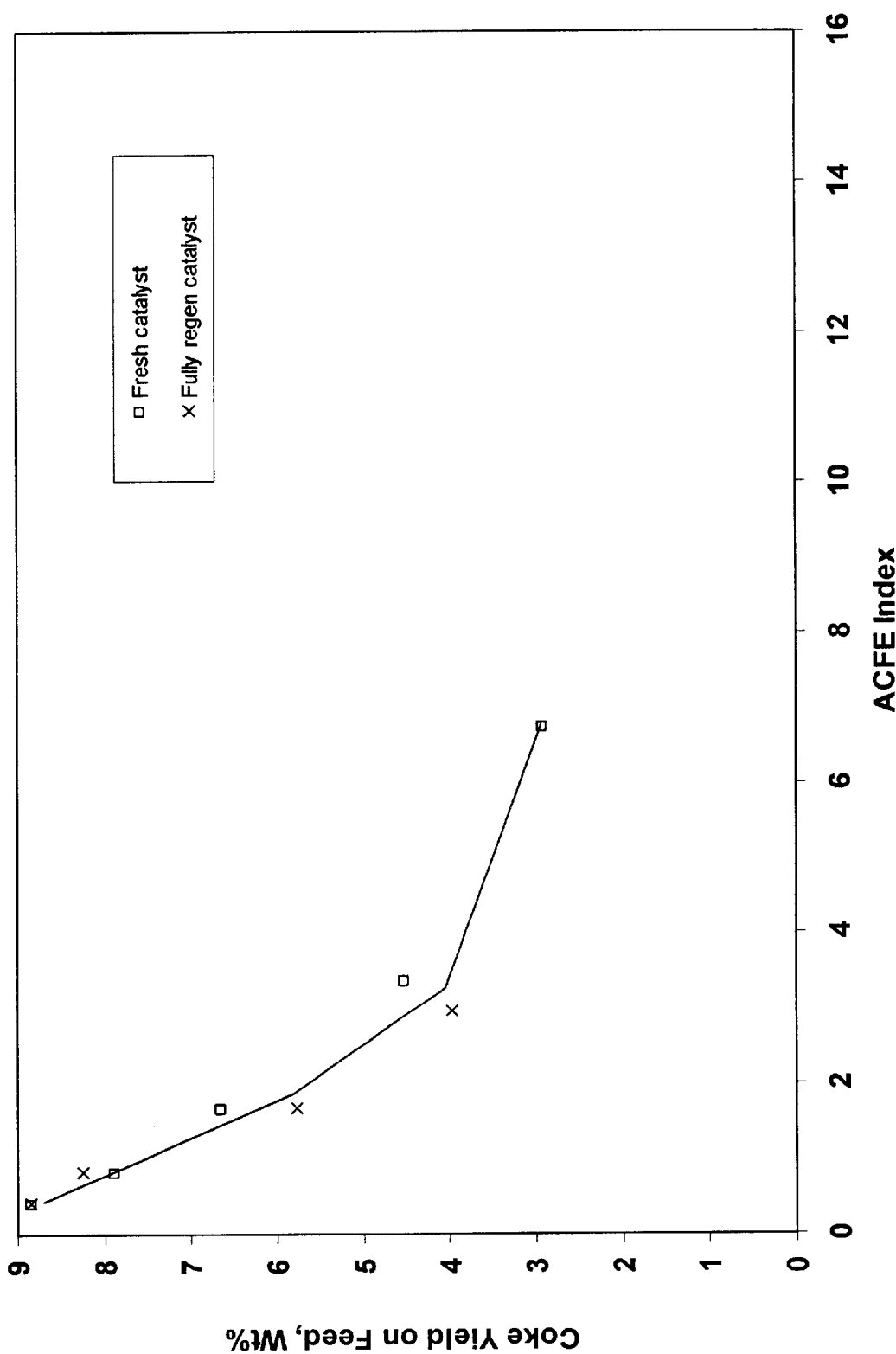
FIG. 3 is a graph which shows the effects of ACFE index on coke yield.

FIG. 3 shows the effects of ACFE index on the average coke yield. It reveals that, at low ACFE index, coke yield is high. At an ACFE greater than 1.0, there is a significant drop in coke yield.

EXAMPLE 4

Figure 4:
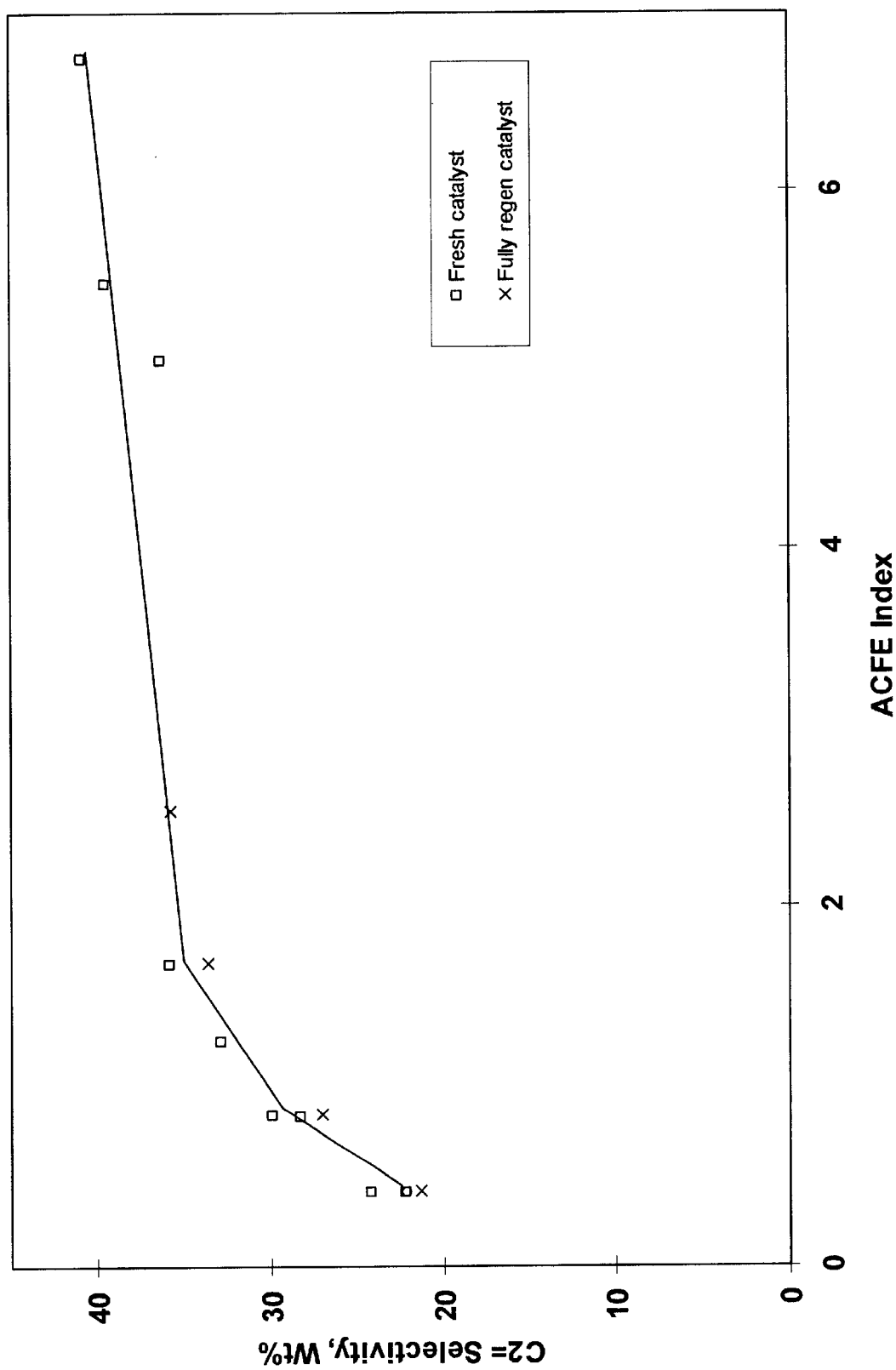
FIG. 4 is a graph which shows the effects of ACFE index on ethylene selectivity.

The products from the reactions in Example 3 were analyzed through an on-line GC column for ethylene selectivity. The results are shown in FIG. 4. FIG. 4 shows that ethylene selectivity is high at an average catalyst feedstock exposure index of 1.0 and greater.

EXAMPLE 5

Figure 5:
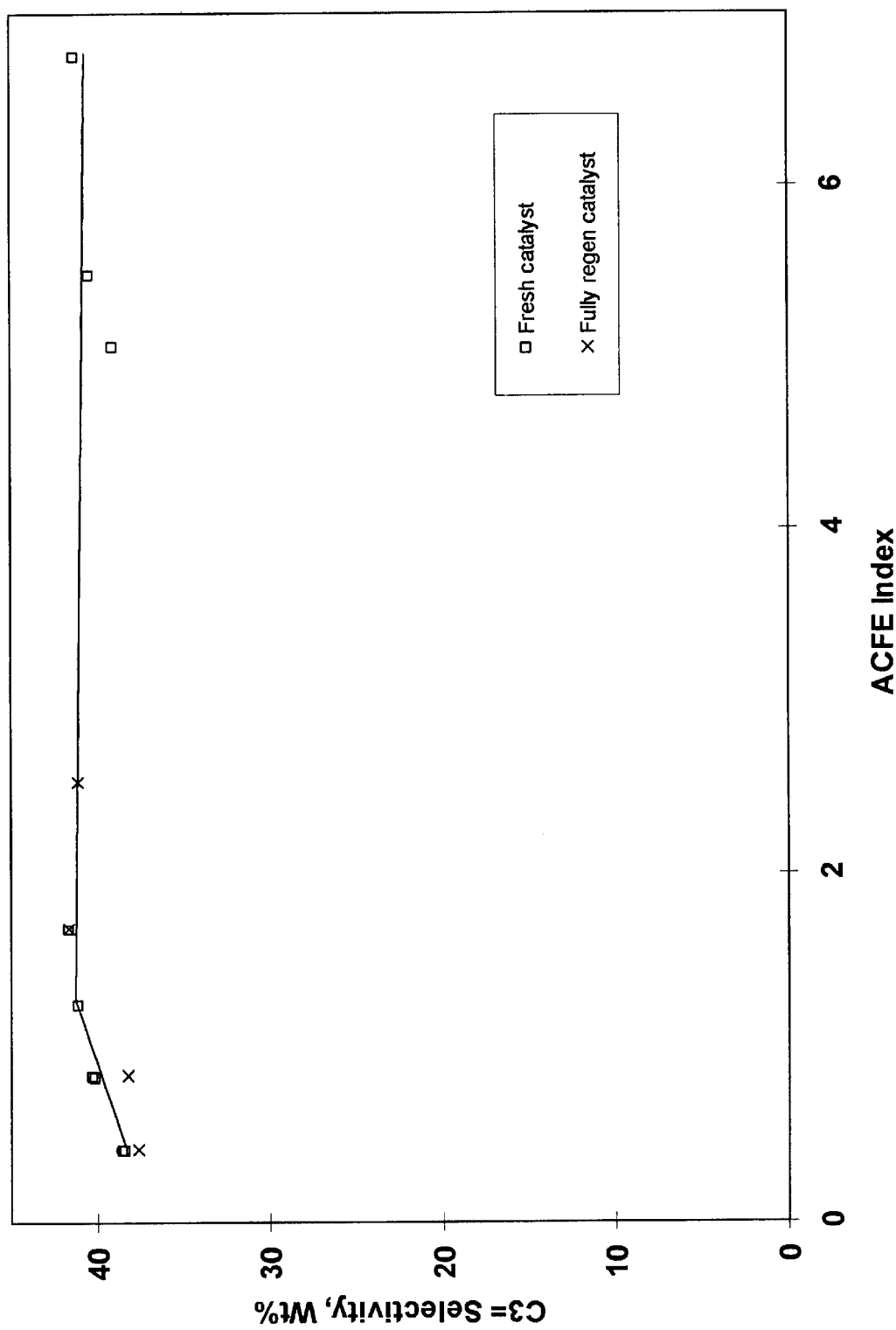
FIG. 5 is a graph which shows the effects of ACFE index on propylene selectivity.

The products from the reactions in Example 3 were analyzed through an on-line GC column for propylene selectivity. The results are shown in FIG. 5. FIG. 5 shows that propylene selectivity is largely unaffected by average catalyst feedstock exposure index.

EXAMPLE 6

Figure 6:
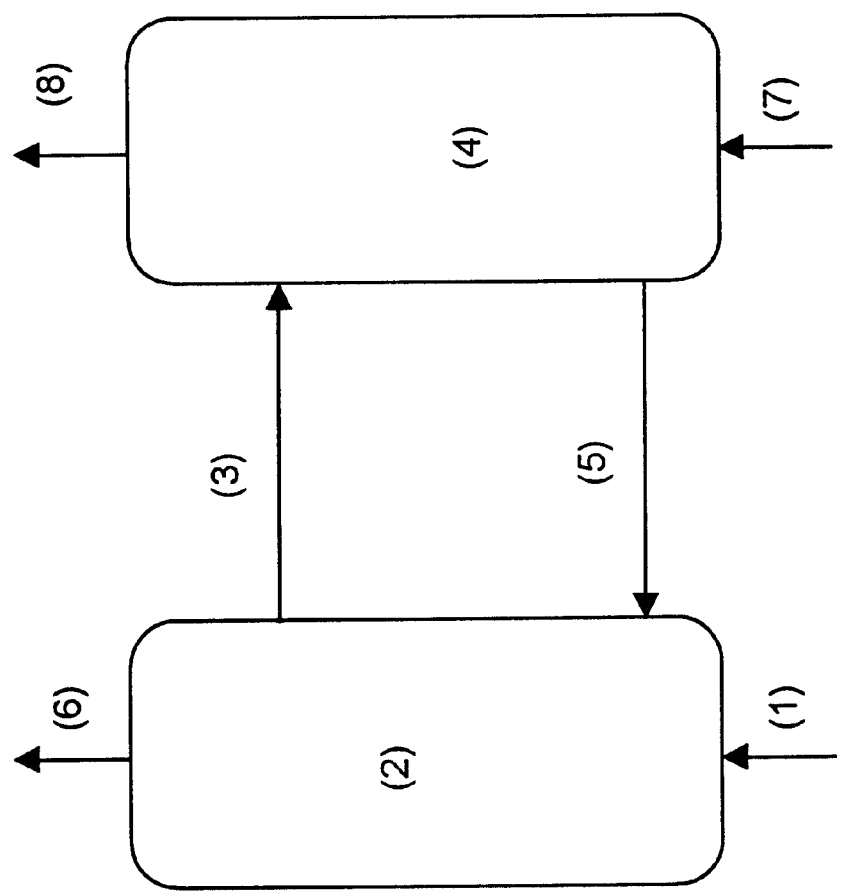
FIG. 6 is a schematic of a reactor system which can be used according to one embodiment of the invention. The reactor system comprises a fluidized bed with a continuous regenerator. Methanol and $C_4$ hydrocarbon (1) is feed to reactor (2) at a rate of 100 lb/hr. A stream of catalyst (3) is sent from the reactor to the regenerator at a flow rate of 40 lb/hr. Over the same period of time a stream of catalyst (4) is sent from the regenerator to the reactor at the same rate as catalyst stream (3).

A reactor system as schematically shown in FIG. 6 can be used according to the invention. The reactor system comprises a fluidized bed with a continuous regenerator. Methanol and $C_4$ hydrocarbon (1) is feed to reactor (2) at a rate of 100 lb/hr. A stream of catalyst (3) is sent from the reactor to the regenerator at a flow rate of 40 lb/hr. Over the same period of time a stream of catalyst (4) is sent from the regenerator to the reactor at the same rate as catalyst stream (3). The catalyst contains 50 wt. % SAPO-34 molecular sieve. The ACFE index is calculated as: (100 lb/hr (methanol+hydrocarbon))/(40 lb/hr catalyst×0.5 lb SAPO/lb catalyst)=5.0.

EXAMPLE 7

Figure 7:
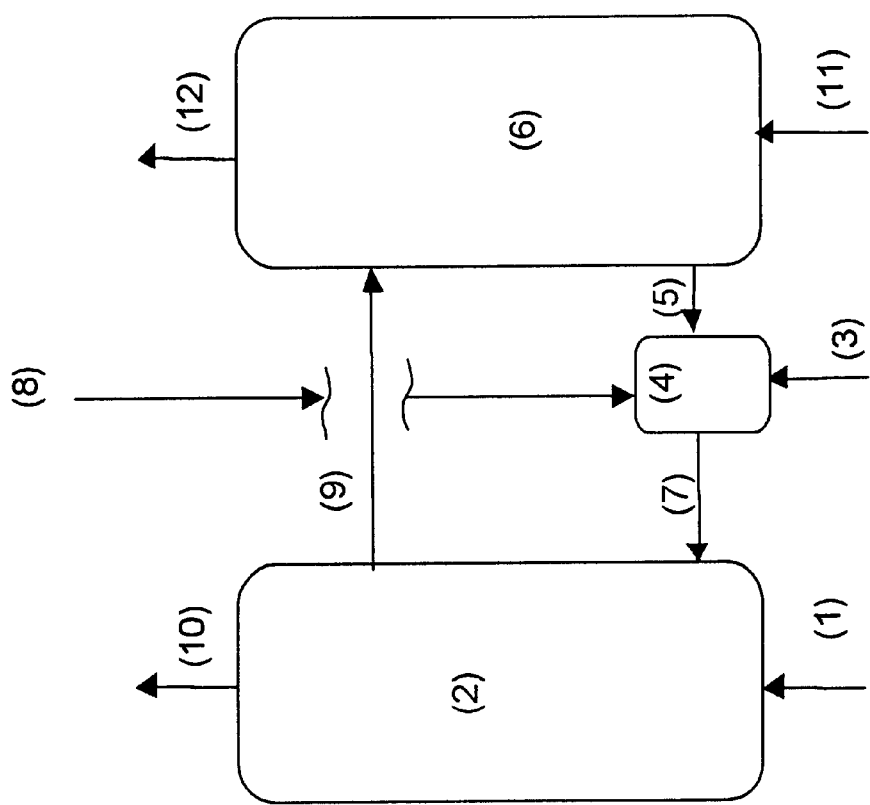
FIG. 7 is a schematic of a reactor system which can be used according to another embodiment of the invention. The reactor system comprises a fluidized bed within a reactor (2). A stream of $C_4^+$ hydrocarbon (3) is sent to an auxiliary reactor (4), also within the reactor system, and contacts catalyst (5) coming from the regenerator (6) to the auxiliary reactor (4). Catalyst (7) from the auxiliary reactor is then sent to the reactor (2), with product and unreacted feed (8) being removed from the auxiliary reactor (4).

A reactor system as schematically shown in FIG. 7 can be used according to the invention. The reactor system comprises a fluidized bed with a continuous regenerator. Pure methanol is fed at a rate of 100 lb/hr directly to reactor (2) within a reactor system. In addition, a stream of $C_4^+$ hydrocarbon (3) is sent at a rate of 20 lb/hr to an auxiliary reactor (4), also within the reactor system, and contacts catalyst (5) coming from the regenerator (6) to the auxiliary reactor (4). Catalyst (7) from the auxiliary reactor is then sent to the reactor (2) Product and any unreacted feed (8) is removed from the auxiliary reactor (4). The flow rate of catalyst stream (9) to the regenerator (6) is essentially the same as the flow rate of stream (7) and stream (5) over a given period of time at 50 lb/hr. At one short period during the interval of operation, a batch of 10 lb of fresh catalyst is introduced into the regenerator to make up for attrition losses. The catalyst contains 40 wt. % SAPO-18 molecular sieve. From this information it is determined that the ACFE index of the catalyst is: (120 lb/hr (methanol+hydrocarbon))/(50 lb/hr catalyst×0.4 lb SAPO/lb catalyst)=6.0. In this example, because the fresh catalyst is introduced to add inventory to the regenerator, it cannot be distinguished from the catalyst coming from the regenerator, and did not figure into the determination of ACFE index. However, the $C_4^+$ hydrocarbon feed served to provide feed exposure to the catalyst coming from the regenerator, even though the feed material and any reaction products therefrom were never introduced to the reactor where oxygenate conversion was taking place. Therefore, the rate of $C_4^+$ hydrocarbon will figure into the determination of ACFE index.

Having now fully described this invention, it will be appreciated by those skilled in the art that the invention can be performed within a wide range of parameters within what is claimed, without departing from the spirit and scope of the invention.

What is claimed is:

1. A method for continuous production of olefin product, comprising:
   contacting a silicoaluminophosphate molecular sieve catalyst with an oxygenate-containing feedstock in a fluidized bed reactor;
   regenerating continuously at least a portion of the molecular sieve catalyst after having been exposed to the oxygenate-containing feedstock;
   recirculating the regenerated at least a portion of the molecular sieve catalyst into the fluidized bed reactor;
   maintaining an average catalyst feedstock exposure index of at least 1.0;
   maintaining, in the fluidized bed reactor, conditions effective to convert the oxygenate-containing feedstock to olefin product; and
   producing the olefin product.

2. The method of claim 1, wherein the oxygenate-containing feedstock comprises at least one compound selected from the group consisting of methanol; ethanol; n-propanol; isopropanol; $C_4$–$C_{20}$ alcohols; methyl ethyl ether; dimethyl ether; diethyl ether; di-isopropyl ether; formaldehyde; dimethyl carbonate; dimethyl ketone; acetic acid; and mixtures thereof.

3. The method of claim 1, wherein the silicoaluminophosphate catalyst comprises a silicoaluminophosphate molecular sieve and a binder.

4. The method of claim 3, wherein the silicoaluminophosphate molecular sieve is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, metal containing SAPOs thereof, and mixtures thereof.

5. The method of claim 3, wherein the silicoaluminophosphate molecular sieve has a $Si/Al_2$ molar ratio of less than 0.65.

6. The method of claim 1, wherein the oxygenate-containing feedstock is contacted with the silicoaluminophosphate catalyst at 200–700° C.

7. The method of claim 1, wherein the oxygenate-containing feedstock is contacted with the silicoaluminophosphate molecular sieve catalyst in the fluidized bed reactor at an average gas superficial velocity of greater than 1 meter per second.

8. The method of claim 1, wherein the olefin product is contacted with a polyolefin-forming catalyst under conditions effective to form a polyolefin.

9. A method for converting an oxygenate-containing feedstock to an olefin product, comprising:
    contacting an oxygenate-containing feedstock with a silicoaluminophosphate catalyst in a fluidized bed reactor under conditions effective to convert the oxygenate-containing feedstock to an olefin product;
    separating the olefin product from the catalyst;
    regenerating a portion of the separated catalyst;
    recirculating the regenerated catalyst into the fluidized bed reactor contacting the regenerated catalyst with the oxygenate-containing feedstock in the fluidized bed reactor; and
    selecting a recirculation rate for the regenerated catalyst to maintain an average catalyst feedstock exposure index of at least 1.0.

10. The method of claim 9, wherein the oxygenate-containing feedstock comprises at least one compound selected from the group consisting of methanol; ethanol; n-propanol; isopropanol; $C_4$ $C_{20}$ alcohols; methyl ethyl ether; dimethyl ether; diethyl ether; di-isopropyl ether; formaldehyde; dimethyl carbonate; dimethyl ketone; acetic acid; and mixtures thereof.

11. The method of claim 9, wherein the silicoaluminophosphate catalyst comprises a silicoaluminophosphate molecular sieve and a binder.

12. The method of claim 11, wherein the silicoaluminophosphate molecular sieve is selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, metal containing SAPOs thereof, and mixtures thereof.

13. The method of claim 11, wherein the silicoaluminophosphate molecular sieve has a $Si/Al_2$ molar ratio of less than 0.65.

14. The method of claim 11, wherein the oxygenate-containing feedstock is contacted with the silicoaluminophosphate molecular sieve catalyst in the fluidized bed reactor at an average gas superficial velocity of greater than 1 meter per second.

15. The method of claim 9, wherein the oxygenate-containing feedstock is contacted with the silicoaluminophosphate catalyst at 200–700° C.

16. The method of claim 9, wherein regeneration is carried out under conditions effective to obtain a regenerated catalyst having a coke content of less than 2 wt. %.

17. The method of claim 9, wherein the regenerated catalyst is contacted with the separated olefin product prior to contacting with additional oxygenate-containing feedstock.

18. The method of claim 9, wherein additional silicoaluminophosphate catalyst is added to the regenerated catalyst and the combination of additional and regenerated catalyst is contacted with additional feedstock.

19. The method of claim 9, wherein the olefin product is contacted with a polyolefin-forming catalyst under. conditions effective to form a polyolefin.

20. A method for converting an oxygenate-containing feedstock to an olefin product, comprising:
    contacting an oxygenate-containing feedstock with a silicoaluminophosphate catalyst in a fluidized bed reactor under conditions effective to convert the oxygenate-containing feedstock to an olefin product;
    separating the olefin product from the catalyst;
    separating the separated catalyst into a first catalyst portion and a second catalyst portion;
    regenerating the first catalyst portion under conditions effective to obtain a regenerated catalyst having a coke content of less than 2 wt. %;
    combining the regenerated catalyst portion with the second catalyst portion to from a combined catalyst portion;
    recirculating the combined catalyst portion into the fluidized bed reactor;
    contacting the combined catalyst portion with the oxygenate-containing feedstock in the fluided bed reactor; and
    maintaining an average catalyst feedstock exposure index of at least 1.0.

21. The method of claim 20, wherein the oxygenate-containing feedstock comprises at least one compound selected from the group consisting of methanol; ethanol; n-propanol; isopropanol; $C_4$–$C_{20}$ alcohols; methyl ethyl ether; dimethyl ether; diethyl ether; di-isopropyl ether; formaldehyde; dimethyl carbonate; dimethyl ketone; acetic acid; and mixtures thereof.

22. The method of claim 20, wherein the silicoaluminophosphate catalyst comprises a silicoaluminophosphate molecular sieve and a binder.

23. The method of claim 22, wherein the silicoaluminophosphate molecular sieve comprises at least one molecular sieve selected from the group consisting of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, metal containing SAPOs thereof, and mixtures thereof.

24. The method of claim 22, wherein the silicoaluminophosphate molecular sieve has a $Si/Al_2$ molar ratio of less than 0.65.

25. The method of claim 20, wherein the oxygenate-containing feedstock is contacted with the silicoaluminophosphate catalyst at 200–700° C.

26. The method of claim 25, wherein the oxygenate-containing feedstock is contacted with the silicoaluminophosphate molecular sieve catalyst in the fluidized bed reactor at an average gas superficial velocity of greater an 1 meter per second.

27. The method of claim 20, wherein the regenerated catalyst is contacted with the separated olefin product prior to combining with the second catalyst portion.

28. The method of claim 20, wherein the olefin product is contacted with a polyolefin-forming catalyst under conditions effective to form a polyolefin.

* * * * *